(12) United States Patent
Kumamoto (10) Patent No.: US 9,105,220 B2
(45) Date of Patent: Aug. 11, 2015

(54) PROJECTOR AND CONTROL METHOD

(71) Applicant: SEIKO EPSON CORPORATION, Tokyo (JP)

(72) Inventor: Osamu Kumamoto, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 29 days.

(21) Appl. No.: 14/175,680

(22) Filed: Feb. 7, 2014

(65) Prior Publication Data
US 2014/0267451 A1    Sep. 18, 2014

(30) Foreign Application Priority Data
Mar. 13, 2013    (JP) .................................. 2013-050107

(51) Int. Cl.
*G09G 5/10*    (2006.01)

(52) U.S. Cl.
CPC ....................................... *G09G 5/10* (2013.01)

(58) Field of Classification Search
CPC ................... G09G 3/3406; G09G 2320/0626; G09G 2320/0646; H04N 5/74; H04N 9/31; H04N 9/3197; H04N 9/3155
See application file for complete search history.

(56) References Cited

U.S. PATENT DOCUMENTS

| | | | |
|---|---|---|---|
| 7,436,399 B2 | 10/2008 | Naito | |
| 2004/0257318 A1* | 12/2004 | Itoh | 345/87 |
| 2007/0120806 A1* | 5/2007 | Schmidt et al. | 345/102 |
| 2009/0167658 A1* | 7/2009 | Yamane et al. | 345/102 |

FOREIGN PATENT DOCUMENTS

JP    A-2003-280087    10/2003

\* cited by examiner

*Primary Examiner* — Regina Liang
(74) *Attorney, Agent, or Firm* — Oliff PLC (57) ABSTRACT

A projector includes a light source, a light source control section adapted to control a luminance of light emitted from the light source, an acquisition section adapted to obtain an image signal, a projection section adapted to project image light obtained by modulating the light emitted from the light source based on the image signal obtained by the acquisition section, and the correction section adapted to correct the image signal, when the luminance of the light emitted from the light source changes under control of the light source control section, so that a variation in an output luminance of the image light projected by the projection section is increased to a level greater than the variation in the luminance of the light emitted by the light source.

5 Claims, 6 Drawing Sheets

FIG. 6

PROJECTOR AND CONTROL METHOD

CROSS-REFERENCE TO RELATED APPLICATION

The entire disclosure of Japanese Patent Application No. 2013-050107, filed Mar. 13, 2013 is expressly incorporated by reference herein.

BACKGROUND

1. Technical Field

The present invention relates to a projector and a control method.

2. Related Art

There is a device, which controls the luminance of a light source depending on the use condition when projecting an image using a projector. For example, a technology described in JP-A-2003-280087 (Document 1) relates to an image display device provided with an image displaying light modulation element, a lamp for illuminating the image displaying light modulation element, and a fan for cooling the lamp, the image display device further including image muting means for setting a display screen of the image display device to a nondisplay state or a predetermined display state set in advance, and lamp output luminance control means for controlling the output luminance of the lamp in response to the setting or release of the setting by the image muting means.

However, even in the case of using the technology described in Document 1, it is required for a lamp used as a light source of a projector to gradually vary the state of the lamp to a bright state when setting the lamp, which has once been set to a dark state, to the bright state in order to prevent a damage to the lamp, and as a result, there is a disadvantage that it takes time to change the luminance. Further, also in the case of changing the state of the lamp from the bright state to the dark state, it is required to gradually vary the state of the lamp to the dark state in order to prevent a damage to the lamp, and as a result, there is a disadvantage that it also takes time to change the luminance. As described above, there is a problem that the convenience of the user is insufficient when changing the luminance of the light source.

SUMMARY

An advantage of some aspects of the invention is to provide a projector and a control method each capable of enhancing the convenience of the user when changing the luminance of the light source.

An aspect of the invention is directed to a projector including a light source, a light source control section adapted to control a luminance of light emitted from the light source, an acquisition section adapted to obtain an image signal, a projection section adapted to project image light obtained by modulating the light emitted from the light source based on the image signal obtained by the acquisition section, and a correction section adapted to correct the image signal, when the luminance of the light emitted from the light source changes under control of the light source control section, so that a variation in an output luminance of the image light projected by the projection section is increased to a level greater than the variation in the luminance of the light emitted from the light source.

According to the configuration described above, since it is possible to make the user perceive the feeling as if the time taken to switch the luminance of the light source were shortened, the convenience of the user in changing the luminance of the light source can be enhanced.

Another aspect of the invention is directed to the projector described above, wherein the correction section switches a correction amount of the image signal in accordance with one of the luminance of the light emitted from the light source, and time with which the luminance of the light emitted from the light source changes.

Still another aspect of the invention is directed to the projector described above, wherein the projector further includes a storage section adapted to store a plurality of correspondence relationships between the image signal and a correction amount of the image signal, and the correction section switches the correspondence relationships stored in the storage section in a stepwise manner, and corrects the image signal based on the correspondence relationship.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Hereinafter, an embodiment of the invention will be explained in detail with reference to the accompanying drawings.

Figure 1:
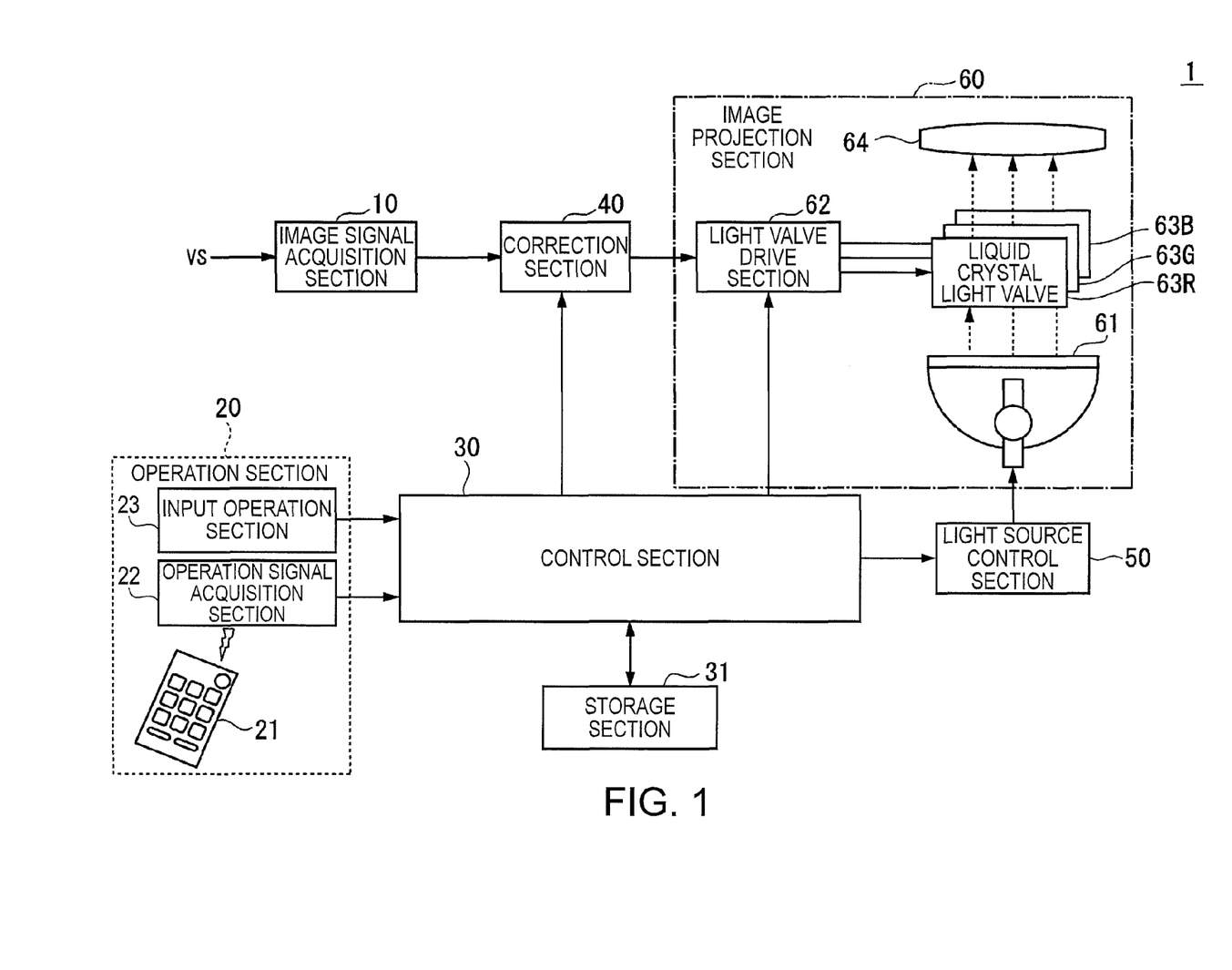
FIG. 1 is a schematic block diagram showing an example of a configuration of a projector according to an embodiment of the invention.

FIG. 1 is a schematic block diagram showing an example of a configuration of a projector 1 according to the embodiment of the invention.

The projector 1 is configured to include an image signal acquisition section 10, an operation section 20, a control section 30, a storage section 31, a correction section 40, a light source control section 50, and an image projection section 60. The operation section 20 is configured to include a remote controller 21, an operation signal acquisition section 22, and an input operation section 23. Further, the image projection section 60 is configured to include a light source 61 (a lamp), a light valve drive section 62, liquid crystal light valves 63R, 63G, and 63B, and a projection lens 64. Although the projector 1 is provided with other functions of a general projector, such functions will be omitted from the drawings and the explanation. Here, the liquid crystal light valves 63R, 63G, and 63B are a red liquid crystal light valve 63R, a green liquid crystal light valve 63G, and a blue liquid crystal light valve 63B, respectively.

The image signal acquisition section 10 (an acquisition section) obtains an image signal VS from the outside of the projector 1 such as a personal computer. The image signal acquisition section 10 outputs the image signal VS thus obtained to the correction section 40.

The operation section 20 receives a variety of operation instructions from the user. The operation section 20 outputs an operation signal, which corresponds to any of the variety of operation instructions input from the user, to the control section 30. Specifically, the remote controller 21 and the input operation section 23 are each provided with operation buttons, a cursor, and so on, and receive the variety of operation instructions from the user. The remote controller 21 outputs the operation signal corresponding to any of the variety of operation instructions to the control section 30 via the operation signal acquisition section 22. The input operation section 23 is provided to, for example, a main body of the projector 1, and outputs the operation signal corresponding to any of the variety of operation instructions to the control section 30.

It should be noted that although in the present embodiment, it is explained that the remote controller 21 and the input operation section 23 are provided, the operation section 20 can also be constituted by either one of the remote controller 21 and the input operation section 23 alone, or it is also possible to adopt a configuration of disposing a communication section to thereby obtain the operation signal from the personal computer or the like with wire of wirelessly, and then outputting the operation signal to the control section 30.

The control section 30 is provided with a central processing unit (CPU), a random access memory (RAM) used for temporarily storing various data, and so on, and operates with a control program stored in the storage section 31 to thereby perform the overall control of the operation of the projector 1. In other words, the control section 30 functions as a computer together with the storage section 31. The control section 30 outputs control signals to the correction section 40, the light source control section 50, and the light valve drive section 62, respectively. Further, the control section 30 stores the control signal in the storage section 31 if necessary.

The storage section 31 includes a non-volatile memory such as a read only memory (ROM) or a flash memory. The storage section 31 stores a control program for controlling the operation of the projector 1, various data, the control signals, a plurality of correspondence tables each representing the correspondence relationship between a signal level of an image signal and a signal level of a pixel signal described later, and so on.

The correction section 40 corrects the level of the image signal VS based on the control signal input from the control section 30, wherein the control signal represents the change in the luminance of the light emitted by the light source 61. Specifically, the correction section 40 generates a pixel signal including a plurality of pixel values representing grayscales of the respective pixels based on the image signal VS input from the image signal acquisition section 10. Further, the correction section 40 performs an image quality adjustment process on the pixel signal thus generated based on the control signal input from the control section 30. Further, the correction section 40 is provided with a plurality of patterns of the input-output characteristics representing the relationship between the signal level (an input level) of the image signal VS and the signal level (an output level) of the pixel signal, refers to the input-output characteristics based on the control signal input from the control section 30 to correct the image signal VS and adjust the grayscale characteristics, a color shade, and so on of the image, and then generates the pixel signal. Further, the correction section 40 corrects the pixel value of each of the pixels via the control section 30 based on the operation signal input from the operation section 20 so that the level of each of the pixels constituting the image signal is varied in accordance with a variation in the luminance of the light emitted by the light source 61, the time with which the luminance of the light emitted by the light source 61 changes, or the time point at which the luminance of the light emitted by the light source 61 changes, to thereby correct the image signal, and then generates the pixel signal. The correction section 40 outputs the image signal (the pixel signal) having been corrected to the light valve drive section 62.

The light source control section 50 performs supply and outage of the power to the light source 61, or restriction and relaxation of the power supply based on the control signal input from the control section 30 to thereby put on or off the light source 61. Thus, the light source control section 50 controls the luminance of the light emitted by the light source 61. Further, the light source control section 50 controls the emission luminance of the light source 61 in the lighting period to a high luminance state or a low luminance state based on the control signal input from the control section 30.

The light source 61 is, for example, a discharge lamp such as a super-high pressure mercury lamp or a metal halide lamp. The light beam emitted from the light source 61 is arranged to illuminate the entire pixel area of each of the three liquid crystal light valves 63R, 63G, and 63B as an illumination object. Partial light beams overlap each other on each of the liquid crystal light valves 63R, 63G, and 63B, and roughly even illumination is performed on the entire pixel area of each of the liquid crystal light valves 63R, 63G, and 63B.

The light valve drive section 62 drives the three liquid crystal light valves 63R, 63G, and 63B based on the pixel signal input from the correction section 40 and the control signal input from the control section 30. As a result, the image (the image light) corresponding to the pixel signal is projected on a projection surface from the image projection section 60. Specifically, the light valve drive section 62 applies a drive voltage corresponding to the pixel signal to each of the pixels of a liquid crystal panel, makes the light having entered the liquid crystal panel be modulated in accordance with the drive voltage to thereby form polarized light having the polarization direction different by pixel, and then emits the polarized light from each of the liquid crystal light valves 63R, 63G, and 63B. In other words, the liquid crystal light valves 63R, 63G, and 63B each transmit the incident light with the transmittance different by pixel in accordance with the pixel signal to thereby form the image light having a predetermined grayscale for each of the colored lights. The image light including the colored lights emitted from the liquid crystal light valves 63R, 63G, and 63B is projected on the projection surface such as a screen by the projection lens 64 in an enlarged manner.

Figure 2:
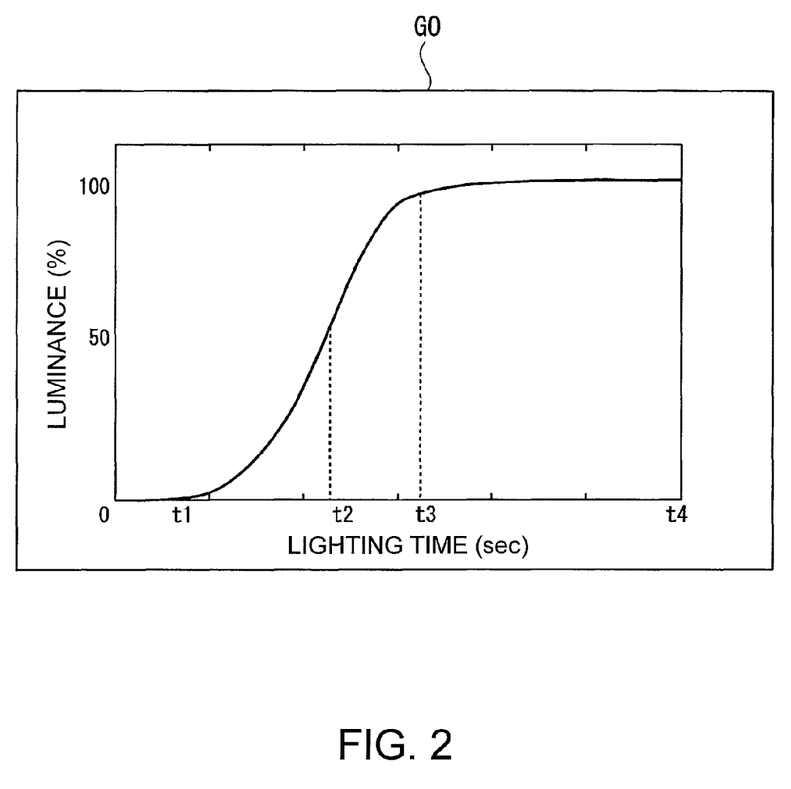
FIG. 2 is a schematic diagram showing an example of a relationship between the luminance of light emitted by a light source and the time with which the luminance changes in an image projection section of the projector according to the present embodiment.

FIG. 2 is a schematic diagram showing an example of a relationship between the luminance of the light emitted by the light source 61 and the time with which the luminance changes in the image projection section 60 of the projector 1 according to the present embodiment.

In FIG. 2, the horizontal axis represents lighting time (sec), the vertical axis represents the luminance (%), and there is shown a characteristic G0 representing the relationship between the variation in the time and the variation in the luminance.

For example, in the light source 61 of the projector 1, the luminance of the light emitted by the light source 61 is 0% of the changed value (the target value) in the period from the time point 0 to the time point t1, then the luminance continues to rise during the period from the time point t1 to the time point t2, then the luminance reaches 50% of the changed value (the target value) at the time point t2, and subsequently the luminance continues to rise until the time point t3. In the period from the time point t3 to the time point t4, the luminance of the light emitted by the light source 61 becomes roughly 100% of the changed value (the target value), and shows a gentle variation.

As described above, since the light source 61 of the projector 1 needs a predetermined time from when starting lighting until the luminance reaches 100% of the changed value (the target value), the light source can be prevented from being damaged.

Figure 3:
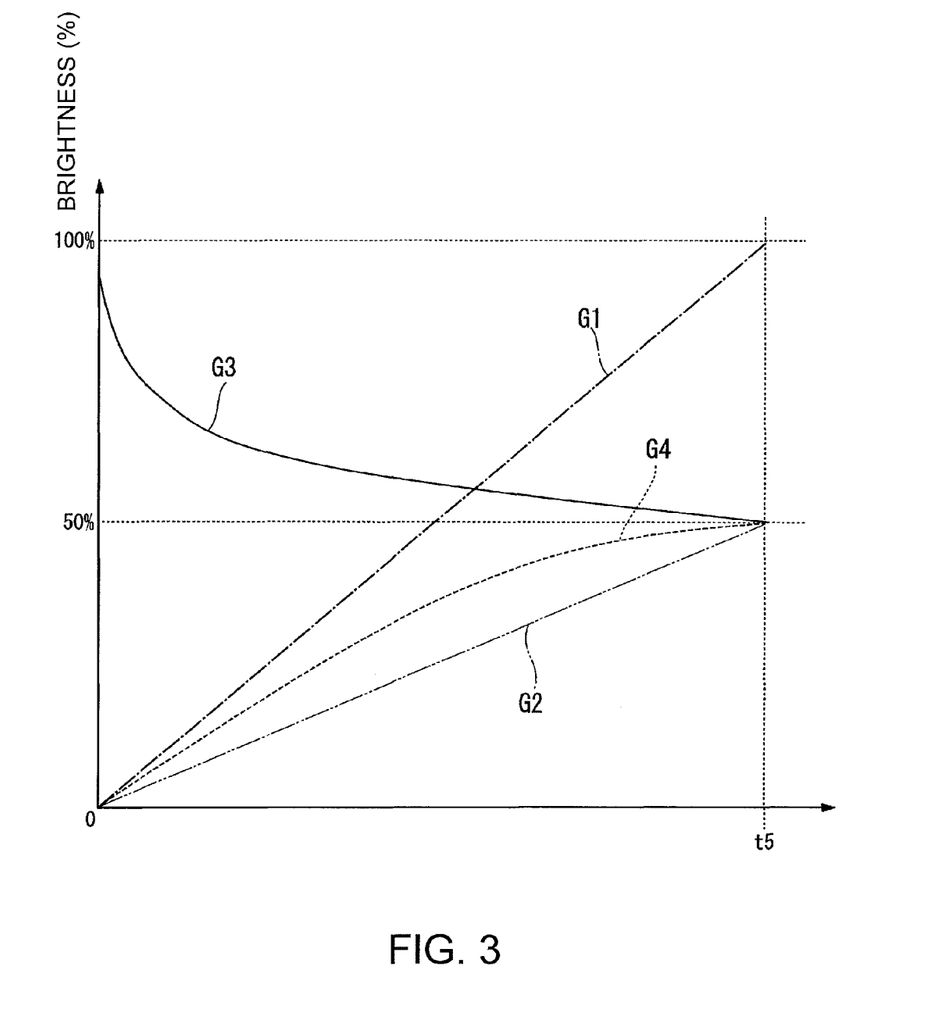
FIG. 3 is a schematic diagram showing an example of a relationship between a variation in the luminance of the light emitted by the light source, a level of a pixel signal corrected and then output by a correction section, and an output luminance of image light projected by the image projection section in the image projection section according to the present embodiment.

FIG. 3 is a schematic diagram showing an example of the relationship between the variation in the luminance of the light emitted by the light source 61, the level of the pixel signal corrected and then output by the correction section 40, and the output luminance of the image light projected by the image projection section 60 in the image projection section 60 according to the present embodiment.

In FIG. 3, the horizontal axis represents the time (sec), and the vertical axis represents the luminance (%).

For example, the characteristic G1 corresponds to the characteristic of the variation in the luminance of the light emitted by the light source 61, the characteristic G2 corresponds to the characteristic of the variation in the output of the image light projected by the image projection section 60 in the case in which the correction section 40 does not correct the level of the pixel signal, the characteristic G3 corresponds to the characteristic of the time variation in the level of the pixel signal in the case in which the correction section 40 corrects the level of the image signal, and the characteristic G4 corresponds to the characteristic of the variation in the output luminance of the image light projected by the image projection section 60 in the case in which the correction section 40 corrects the level of the image signal. Here, FIG. 3 shows an example of the case in which the level (the luminance of the pixel in the input signal) of the image signal is 50% of the changed value (the target value), and the luminance of the light emitted by the light source 61 is changed from 0% to 100% of the changed value (the target value).

The characteristic G1 corresponds to an example in which the luminance (the brightness) of the light emitted by the light source 61 is 0% of the changed value (the target value) at the time point 0, and the light source 61 linearly changes the luminance so that the brightness changes from 0% to 100% of the changed value (the target value) in the period from the time point 0 to the time point t5. On this occasion, the characteristic G2 of the variation in the output luminance of the image light projected by the image projection section 60 in the case in which the correction section 40 does not correct the level of the image signal becomes the characteristic of the brightness changes linearly from 0% to 50% of the changed value (the target value) in the period from the time point 0 to the time point t5. In contrast, the characteristic G3 corresponds to the characteristic of the level of the pixel signal in the case in which the correction section 40 corrects the level of the image signal in accordance with the characteristic G1 of the variation in the luminance of the light emitted by the light source 61. In the characteristic G3, the level of the pixel signal is 90% of the changed value (the target value), for example, at the time point 0, and the brightness gradually decreases to 50% of the changed value (the target value) in the period from the time point 0 to the time point t5. As described above, the correction section 40 corrects the output luminance of the image light projected by the image projection section 60 by correcting the level of the image signal in accordance with the variation (the characteristic G1) in the luminance of the light emitted by the light source 61 to thereby change the correction amount (the characteristic G3) of the level of the pixel signal to be output.

The correction section 40 corrects the level of the image signal to be brighter (e.g., 90% in brightness) if the luminance of the light emitted by the light source 61 is dark (e.g., 0% in brightness), and the correction section 40 decreases the correction amount of the level of the image signal in accordance with the rise in the luminance of the light emitted by the light source 61 to thereby make the user perceive the feeling as if the response speed of changing the luminance of the light emitted by the light source 61 were raised. The characteristic G4 of the variation in the output luminance of the image light projected by the image projection section 60 at this moment becomes the characteristic in which the brightness is 0% of the changed value (the target value) at the time point 0, the brightness gradually increases in the period from the time point 0 to the time point t5, and the brightness converges to 50% of the changed value (the target value) at the time point t5. Therefore, the characteristic G4 becomes an upward-convex characteristic in which the brightness changes faster than in the characteristic G2 corresponding to the case in which the correction section 40 does not correct the level of the image signal. The characteristic G4 of the variation in the output luminance of the image light projected by the image projection section 60 is a characteristic obtained by multiplying the characteristic G1 of the variation in the luminance of the light emitted by the light source 61 and the characteristic G3 of the level of the pixel signal corrected by the correction section 40 by each other.

Another example of the relationship between the luminance of the light emitted by the light source 61, the level of the pixel signal output by the correction section 40 by correcting the level of the image signal, and the output luminance of the image light projected by the image projection section 60 will be explained with reference to FIG. 4.

Figure 4:
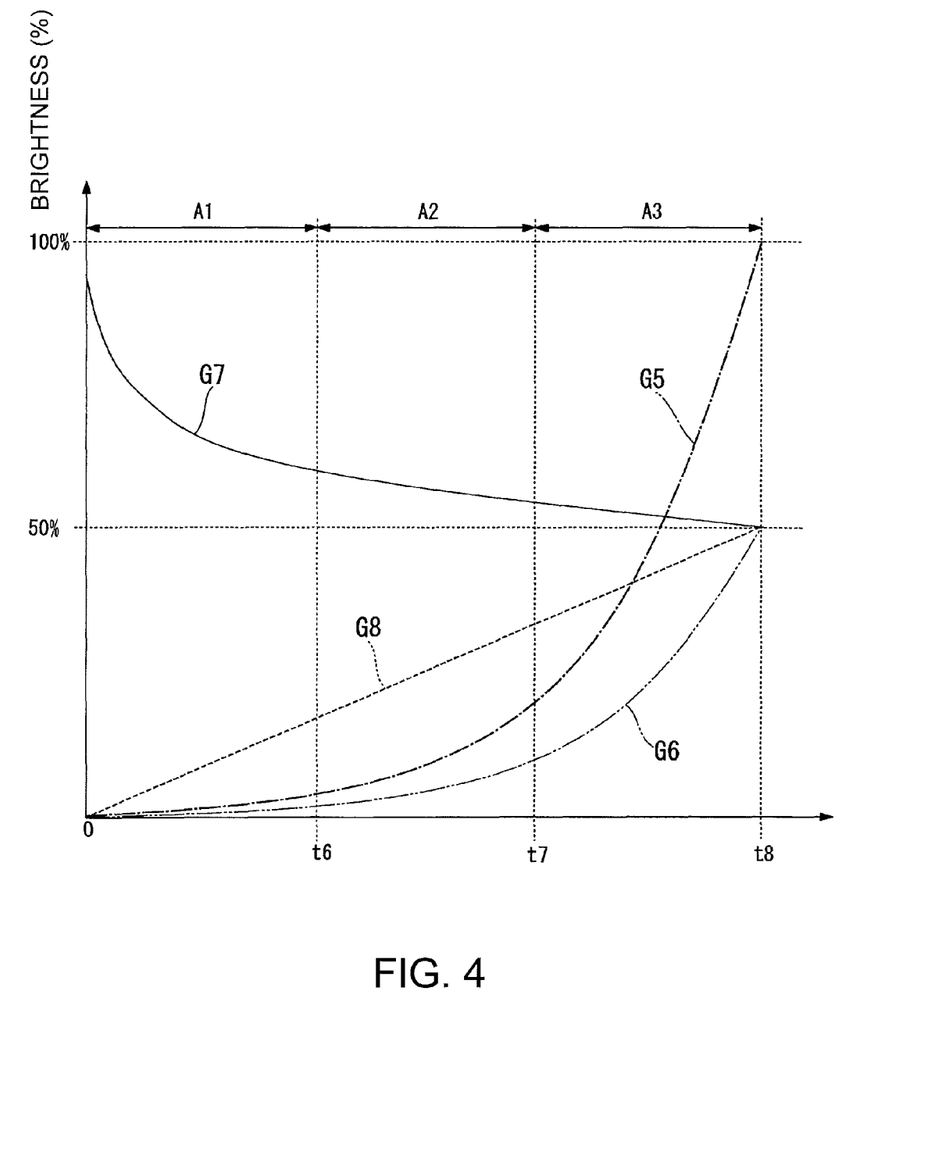
FIG. 4 is a schematic diagram showing an example of the relationship between the variation in the luminance of the light emitted by the light source, the level of the pixel signal corrected and then output by the correction section, and the output luminance of the image light projected by the image projection section in the image projection section according to the present embodiment.

FIG. 4 is a schematic diagram showing an example of the relationship between the variation in the luminance of the light emitted by the light source 61, the level of the pixel signal output by the correction section 40 by correcting the level of the image signal, and the output luminance of the image light projected by the image projection section 60 in the image projection section 60 according to the present embodiment.

In FIG. 4, the horizontal axis represents the time (sec), and the vertical axis represents the luminance (o).

For example, the characteristic G5 corresponds to the characteristic of the variation in the luminance of the light emitted by the light source 61, the characteristic G6 corresponds to the characteristic of the variation in the output luminance of the image light projected by the image projection section 60 in the case in which the correction section 40 does not correct the level of the image signal, the characteristic G7 corresponds to the characteristic of the variation in the level of the pixel signal output by the correction section 40 by correcting the level of the image signal, and the characteristic G8 corresponds to the characteristic of the variation in the output luminance of the image light projected by the image projection section 60 in the case in which the correction section 40 corrects the level of the image signal. Here, FIG. 4 shows an example of the case in which the level (the luminance of the pixel in the input signal) of the image signal is 50% of the changed value (the target value), and the luminance of the light emitted by the light source 61 is changed from 0% to 100% of the changed value (the target value).

In the characteristic G5, the luminance (the brightness) of the light emitted by the light source 61 is 0% of the changed value (the target value) at the time point 0, the luminance of the light emitted by the light source 61 gently rises in the period A1 from the time point 0 to the time point t6, the luminance of the light emitted by the light source 61 rises in the period A2 from the time point t6 to the time point t7 at a rising rate higher than in the period A1, the luminance of the light emitted by the light source 61 rises in the period A3 from the time point t7 to the time point t8 at a rising rate higher than in the period A2, and the luminance of the light emitted by the light source 61 becomes 100% of the changed value (the target value) at the time point t8. On this occasion, in the characteristic G6 of the variation in the output luminance of the image light projected by the image projection section 60 in the case in which the correction section 40 does not correct the level of the image signal, the luminance of the light emitted by the light source 61 rises in the period A1 more gently than in the characteristic G5, and the luminance of the light emitted by the light source 61 rises in the period A2 at a rising rate higher than in the period A1, and more gently than in the characteristic G5. Further, in the characteristic G6 of the variation in the output luminance of the image light projected by the image projection section 60, the luminance of the light emitted by the light source 61 rises in the period A3 at a rising rate higher than in the period A2 and more gently than in the characteristic G5, and the brightness becomes 50% of the changed value (the target value) at the time point t8. In contrast, the characteristic G7 corresponds to the characteristic of the variation in the level of the pixel signal output by the correction section 40 by correcting the level of the image signal in accordance with the characteristic G5 of the variation in the luminance of the light emitted by the light source 61. In the characteristic G7, the level of the pixel signal, namely the brightness, is 90% of the changed value (the target value), for example, at the time point 0, and the brightness gradually decreases to 50% of the changed value (the target value) in the period from the time point 0 to the time point t8. As described above, the correction section 40 changes the correction amount (the characteristic G7) of the level of the image signal in accordance with the variation (the characteristic G5) in the luminance of the light emitted by the light source 61, and corrects the output luminance of the image light projected by the image projection section 60.

The correction section 40 corrects the level of the image signal to be brighter (e.g., 90% in brightness) if the luminance of the light emitted by the light source 61 is dark (e.g., 0% in brightness), and the correction section 40 decreases the correction amount of the level of the image signal in accordance with the rise in luminance of the light emitted by the light source 61 to thereby make the user perceive the feeling as if the response speed of changing the luminance of the light emitted by the light source 61 were raised. The characteristic G8 of the variation in the output luminance of the image light projected by the image projection section 60 at this moment becomes the characteristic in which the brightness is 0% of the changed value (the target value) at the time point 0, the brightness gradually increases in the period from the time point 0 to the time point t8, and the brightness converges to 50% of the changed value (the target value) at the time point t8. The characteristic G8 of the variation in the output luminance of the image light projected by the image projection section 60 is a characteristic obtained by multiplying the characteristic G5 of the variation in the luminance of the light emitted by the light source 61 and the characteristic G7 of the level of the pixel signal output by the correction section 40 by correcting the level of the image signal by each other.

Then, the case in which the correction section 40 refers to the correspondence relationship between the input level and the output level to correct the level of the image signal will be explained.

Figure 5:
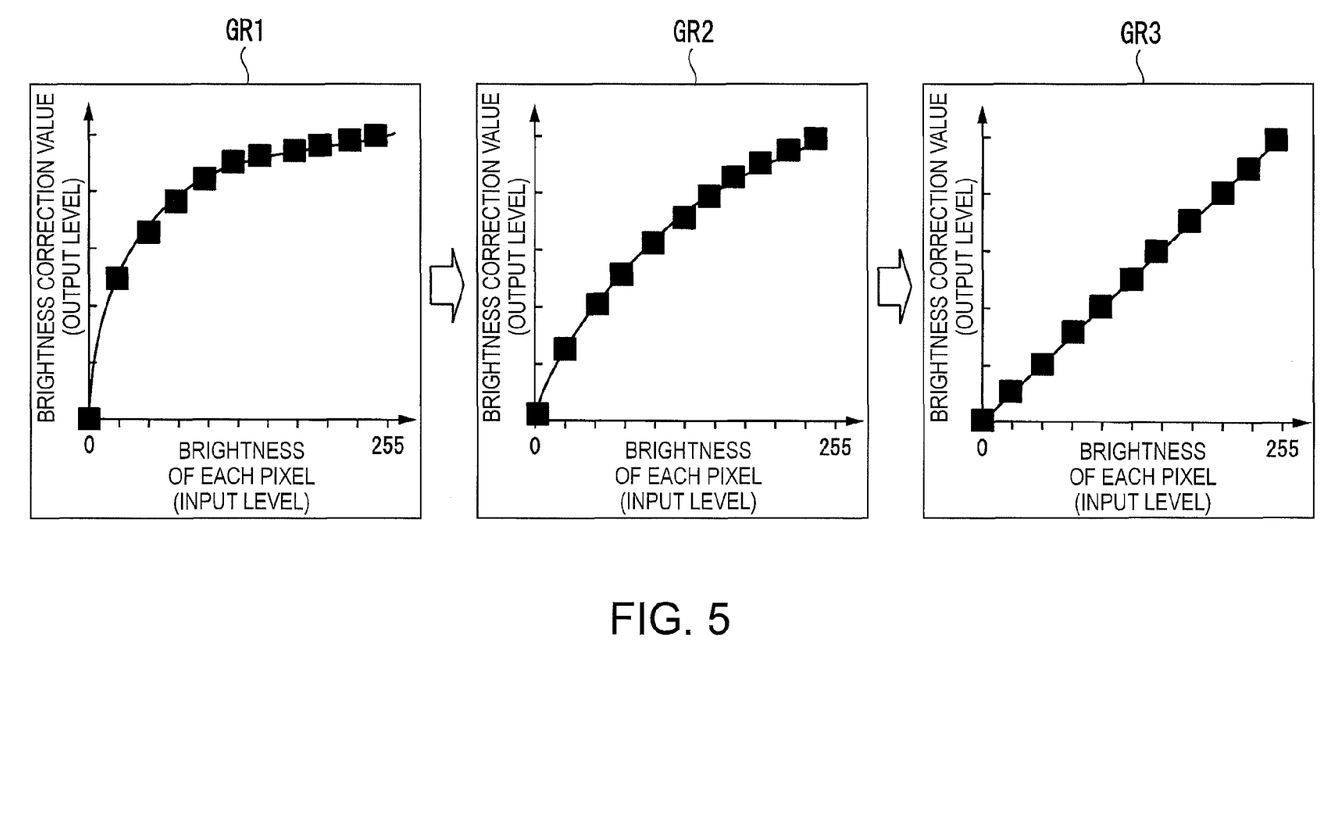
FIG. 5 is a diagram showing an example of a correspondence relationship of the level of the pixel signal with respect to a level of an image signal referred to by the correction section according to the present embodiment.

FIG. 5 is a diagram showing an example of the correspondence relationship of the level of the pixel signal with respect to the level of the image signal referred to by the correction section 40 according to the present embodiment.

In each of the characteristics GR1, GR2, and GR3 shown in FIG. 5, the horizontal axis represents the brightness of each pixel related to the level of the image signal, and the vertical axis represents the brightness of each pixel related to the level of the pixel signal. Further, the characteristics GR1, GR2, and GR3 referred to by the correction section 40 correspond respectively to the time points t6, t7, and t8 in FIG. 4, and the correction section 40 refers to the characteristic GR1 at the time point t6, refers to the characteristic GR2 at the time point t7, and refers to the characteristic GR3 at the time point t8.

It should be noted that although there is described the example in which the correspondence relationship of the level of the pixel signal with respect to the level of the image signal referred to by the correction section 40 shown in FIG. 5 is applied to FIG. 4, it can also be applied to FIG. 3 in a similar manner.

As described above, the correction section 40 switches the characteristics GR1, GR2, and GR3 at each of the time points in accordance with the variation in the luminance of the light emitted by the light source 61 varying with time to increase the variation in the output luminance of the image light, and thus, it is possible to make the user perceive the feeling as if the response to the variation in the luminance of the light emitted by the light source 61 were quickened.

It should be noted that it is also possible that in FIG. 5, the characteristics GR1, GR2, and GR3 referred to by the correction section 40 is made to correspond respectively to the characteristics of the corrections performed in the periods A1, A2, and A3, and the correction section 40 refers to the characteristic GR1 in the period A1, refers to the characteristic GR2 in the period A2, and refers to the characteristic GR3 in the period A3 period by period.

Further, in the present embodiment, in the case in which the correction section 40 performs the correction exceeding a predetermined grayscale, the user is once made to perceive that the brightness increases, and then perceives that the brightness decreases. Therefore, it is preferable for the correction section 40 not to perform such a correction as temporarily exceeding a predetermined grayscale. Here, the predetermined grayscale denotes the target grayscale after the change. Further, in the present embodiment, although it is explained that the correction section 40 determines the correction amount of the level of the image signal in accordance with the variation in the luminance of the light source 61, it is also possible to determine the correction amount of the level of the image signal in accordance with the period in (the time point at) which the luminance of the light source 61 changes. On this occasion, it is possible that the storage section 31 stores in advance a correspondence relationship where the time with which the luminance of the light source 61 changes and the correction amount of the level of the image signal are made to correspond to each other, and the correction section 40 switches the correction amount of the level of the image signal in accordance with the time with which the luminance of the light source 61 changes with reference to the correspondence relationship.

It should be noted that although it is explained that the correction section 40 changes the correction amount for correcting the level of the image signal in a stepwise manner with reference to the three correspondence tables between the brightness of each pixel related to the level of the image signal and the brightness of each pixel related to the level of the image signal, the correction section 40 can also refer to two correspondence tables, or four or more correspondence tables.

Figure 6:
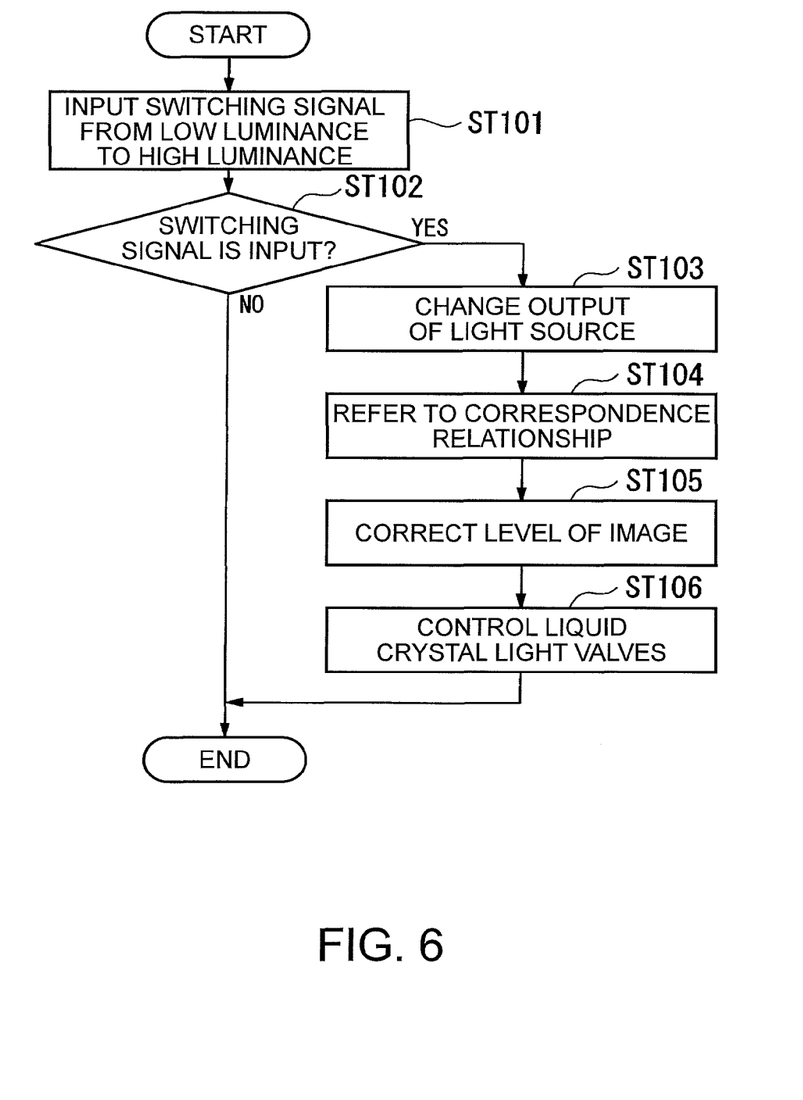
FIG. 6 is a flowchart showing an example of the variation in the luminance of the light emitted by the light source and a correction process of the level of the image signal in the correction section according to the present embodiment.

FIG. 6 is a flowchart showing an example of the variation in the luminance of the light emitted by the light source 61 and the correction process of the level of the image signal in the correction section 40 according to the present embodiment.

In the step ST101, a switching signal for switching the light source 61 from the low luminance state to the high luminance state is received as the operation signal from the user via the operation section 20.

In the step ST102, the control section 30 determines whether or not the switching signal for switching from the low luminance state to the high luminance state is input as the operation signal. In the case (NO) in which the switching signal for switching from the low luminance state to the high luminance state is not input as the operation signal, the control section 30 does not perform the subsequent process. On the other hand, in the case (YES) in which the switching signal for switching from the low luminance state to the high luminance state is input as the operation signal, the process proceeds to the step ST103. On this occasion, the control section 30 outputs a switching signal for switching from the low luminance state to the high luminance state to the correction section 40, the light source control section 50, and the light valve drive section 62 as the control signal.

In the step ST103, when the switching signal for switching from the low luminance state to the high luminance state is input from the control section 30 as the control signal, the light source control section 50 switches the light source 61 from the low luminance state to the high luminance state.

In the step ST104, when the switching signal for switching from the low luminance state to the high luminance state is input from the control section 30 as the control signal, the correction section 40 refers to the correspondence table of the level of the pixel signal with respect to the level of the image signal as the correspondence relationship.

In the step ST105, the correction section 40 determines the correction amount of the level of the pixel signal based on the correspondence relationship of the level of the pixel signal with respect to the level of the image signal, and then generates the pixel signal obtained by correcting the level of the image signal using the correction amount thus determined. The correction section 40 outputs the pixel signal thus generated to the light valve drive section 62.

In the step ST106, the light valve drive section 62 drives the three liquid crystal light valves 63R, 63G, and 6313 based on the pixel signal input from the correction section 40 and the control signal input from the control section 30.

It should be noted that in the case of changing the luminance of the light emitted by the light source 61 from the bright state to the dark state, for example, in the case of changing the luminance of the light emitted by the light source 61 from 100% in brightness to 0% in brightness, it is also possible for the correction section 40 to change the correction amount of the level of the image signal with a predetermined step, or to change the correction amount of the level of the image signal in a stepwise manner in accordance with the variation in the luminance of the light emitted by the light source 61.

As described above, according to the present embodiment, the projector 1 is provided with the light source 61, the light source control section 50 adapted to control the luminance of the light emitted from the light source 61, the acquisition section (the image signal acquisition section 10) adapted to obtain the image signal, the projection section (the image projection section 60) adapted to project the output luminance of the image light, which is obtained by modulating the light emitted from the light source 61 based on the image signal obtained by the acquisition section (the image signal acquisition section 10), and the correction section 40 adapted to correct the image signal, when the luminance of the light emitted from the light source 61 changes under the control of the light source control section 50, so that the variation in the output luminance of the image light projected by the projection section (the image projection section 60) is increased to a level greater than the variation in the luminance of the light emitted by the light source 61.

Thus, when the light source control section 50 changes the luminance of the light emitted by the light source 61, the projector 1 can correct the image signal so that the variation in the output luminance of the image is increased to a level greater than the variation in the luminance of the light emitted by the light source 61. Therefore, since it is possible to make the user perceive the feeling as if the time taken to switch the luminance of the light emitted by the light source 61 were shortened, the convenience of the user in changing the luminance of the light source 61 can be enhanced.

It should be noted that although in the present embodiment, it is explained that the correction section 40 generates the pixel signal with reference to the correspondence tables of the brightness of each pixel related to the level of the pixel signal to the brightness of each pixel related to the level of the image signal as the correspondence relationship, it is also possible for the correction section 40 to generate the pixel signal with reference to a table having the level of the image signal and the level of the pixel signal corresponding to each other as the correspondence relationship, to generate the pixel signal with reference to a characteristic of the correspondence between the time with which the luminance of the light emitted by the light source 61 changes and the level of the pixel signal as the correspondence relationship, to generate the pixel signal using a function related to the luminance of the light emitted by the light source 61 and the transmittance of each of the liquid crystal light valves 63R, 63G, and 63B as the correspondence relationship, or to generate the pixel signal using a calculating formula related to the level of the image signal and the level of the pixel signal as the correspondence relationship.

Further, although it is explained that the light valve drive section 62 changes the transmittance of the light from the light source 61 using the liquid crystal light valves 63R, 63G, and 63B, it is also possible to use reflective devices such as a digital mirror device (DMD™). In this case, it is possible to change the reflectance instead of the transmittance.

It should be noted that it can also be arranged that a part or the whole of the projector 1 in the embodiment described above is realized with a computer. In this case, it is also possible to realize the control function by storing a program for realizing the control function in a computer-readable storage medium, and then making the computer system retrieve and then execute the program stored in the storage medium.

It should be noted that the "computer system" mentioned here corresponds to a computer system incorporated in the projector 1, and should include an OS and hardware such as peripheral devices. Further, the "computer-readable storage medium" denotes a portable medium such as a flexible disk, a magneto-optical disk, a ROM, and a CD-ROM, and a storage device such as a hard disk incorporated in the computer system. Further, the "computer-readable storage medium" can include those dynamically holding a program for a short period of time such as a communication line in the case of transmitting the program via a communication line such as a telephone line or a network such as the Internet, and those holding a program for a certain period of time such as a volatile memory in a computer system to be a server or a client in that occasion. Further, the program described above can be one for partially realizing the functions described above, or one realizing the functions described above in combination with a program having already been stored in the computer system.

Further, it is also possible to realize a part or the whole of the projector 1 in the embodiment described above as an integrated circuit such as an LSI (Large Scale Integration). Each of the functional blocks of the projector 1 can individually be realized as a processor, or can partly or totally be integrated as a processor. Further, the method of the circuit integration is not limited to LSI, but the circuit can be realized by a dedicated circuit or a general-purpose processor. Further, in the case in which a technology of the circuit integration replacing the LSI appears due to the advance in semiconductor technology, it is also possible to use an integrated circuit derived from such a technology.

Further, the image data is input as the image signal, and the light valves perform the light modulation on the light emitted by the lamp based on the image data input to the input section.

In the case of changing the lamp from the OFF state to the ON state, or changing the luminance of the projection light from an extremely low luminance to a high luminance, it is also possible to correct the drive voltage of each of the light valves so that the transmittance of each of the light valves more quickly changes from 0% to 100% by applying a bias to the voltage obtained by a V-t (voltage-transmittance) curve when generating the voltage to be applied to each of the light valves so that the faster increase is achieved in the luminance variation on the projection surface by the projection section compared to the normal time necessary for the change from 0% to 50%. It should be noted that in the case of using the DMD™ as the light valves, a V-r (voltage-reflectance) curve is used.

Although an embodiment of the invention is hereinabove explained in detail with reference to the accompanying drawings, the specific configuration is not limited to the configuration described above, but a variety of design changes can be made within the scope or the spirit of the invention.

What is claimed is:

1. A projector comprising:
a light source;
a light source control section adapted to control a luminance of light emitted from the light source;
an acquisition section adapted to obtain an image signal;
a projection section adapted to project image light obtained by modulating the light emitted from the light source based on the image signal obtained by the acquisition section; and
a correction section adapted to correct the image signal, when the luminance of the light emitted from the light source changes under control of the light source control section, so that a variation in an output luminance of the image light projected by the projection section is increased to a level greater than the variation in the luminance of the light emitted from the light source.

2. The projector according to claim 1, wherein
the correction section switches a correction amount of the image signal in accordance with one of the luminance of the light emitted from the light source, and time with which the luminance of the light emitted from the light source changes.

3. The projector according to claim 1, further comprising:
a storage section adapted to store a plurality of correspondence relationships between the image signal and a correction amount of the image signal,
wherein the correction section switches the correspondence relationships stored in the storage section in a stepwise manner, and corrects the image signal based on the correspondence relationship.

4. A control method comprising:
controlling a luminance of light emitted from a light source;
obtaining an image signal;
projecting image light obtained by modulating the light emitted from the light source based on the image signal obtained in the obtaining of an image signal; and
correcting the image signal, when the luminance of the light emitted from the light source changes due to control in the controlling of the light source, so that a variation in an output luminance of the image light projected in the projecting of image light is increased to a level greater than the variation in the luminance of the light emitted from the light source.

5. A projector comprising:
a light source;
a light source control section adapted to control a luminance of light emitted from the light source;
an input section to which image data is input;
a light modulation section adapted to modulate the light emitted from the light source based on the image data input to the input section;
a projection section adapted to project image light obtained by the modulation by the light modulation section; and
a correction section adapted to correct a voltage for driving the light modulation section, when the luminance of the light emitted from the light source changes under control of the light source control section, so that a variation in an output luminance of the image light projected by the projection section is increased to a level greater than the variation in the luminance of the light emitted from the light source.

* * * * *